United States Patent
Monk et al.

(10) Patent No.: US 6,539,308 B2
(45) Date of Patent: *Mar. 25, 2003

(54) DUAL SENSOR SIGNAL PROCESSING METHOD FOR ON-BOTTOM CABLE SEISMIC

(75) Inventors: David J. Monk, Sugar Land, TX (US); James A. Musser, Longmont, CO (US)

(73) Assignee: Input/Output Inc., Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/999,115

(22) Filed: Nov. 1, 2001

(65) Prior Publication Data

US 2003/0028326 A1 Feb. 6, 2003

Related U.S. Application Data

(63) Continuation-in-part of application No. 09/598,718, filed on Jun. 21, 2000, now Pat. No. 6,314,371.
(60) Provisional application No. 60/141,197, filed on Jun. 25, 1999.

(51) Int. Cl.$^7$ ............................................... G06F 19/00
(52) U.S. Cl. ........................................... 702/17; 702/14
(58) Field of Search .............................. 702/14, 17, 18; 367/24

(56) References Cited

U.S. PATENT DOCUMENTS

| | | | |
|---|---|---|---|
| 4,979,150 A | 12/1990 | Barr | 367/24 |
| 5,774,416 A | 6/1998 | Sadek et al. | 367/24 |
| 6,101,448 A | * 8/2000 | Ikelle et al. | 702/17 |
| 6,148,264 A | * 11/2000 | Houck et al. | 702/14 |

* cited by examiner

*Primary Examiner*—Edward Lefkowitz
*Assistant Examiner*—Victor J. Taylor
(74) *Attorney, Agent, or Firm*—Madan, Mossman & Sriram, P.C.

(57) ABSTRACT

A method for processing data from dual sensor receivers to produce a combined seismic trace. A first seismic trace is received from a geophone and second seismic trance from a hydrophone in a dual sensor receiver. This first and second seismic traces are transformed into a first and second seismic spectrum. The seismic spectrums are deghosted to obtain deghosted spectrums. The seismic spectra may be added to obtain a deghosted third spectrum. An inverse power is computed for each of the deghosted spectra. The inverse powers for each deghosted spectra are divided by sums of the deghosted spectra to obtain diversity filters. The first and third diversity filters are applied to the first seismic spectrum to obtain a scaled first seismic spectrum. The other scaled spectra are formed in a like manner. The diversity scaled seismic spectrum is inversely transformed to obtain the combined seismic trace.

17 Claims, 7 Drawing Sheets

DUAL SENSOR SIGNAL PROCESSING METHOD FOR ON-BOTTOM CABLE SEISMIC

CROSS REFERENCES TO RELATED APPLICATIONS

This application is a Continuation-in-Part of U.S. patent application Ser. No. 09/598,718 filed on Jun. 21, 2000, now U.S. Pat. No. 6,314,371 and U.S. Provisional Patent Application 60/141,197 filed on Jun. 25, 1999. These entire specifications are hereby fully incorporated by reference.

BACKGROUND OF THE INVENTION

1. Field of the Invention

The present invention relates generally to the field of seismology, and more particularly to the processing of signals from dual-sensor arrays to eliminate undesired seismic energy.

2. Description of the Related Art

The field of seismology focuses on the use of artificially generated elastic waves to locate mineral deposits such as hydrocarbons, ores, water, and geothermal reservoirs. Seismic exploration provides data that, when used in conjunction with other available geophysical, borehole, and geological data can provide information about the structure and distribution of rock types and their contents.

Most oil companies rely on seismic interpretation for selecting the sites in which to invest in drilling oil wells. Despite the fact that seismic data is used to map geological structures rather than finding petroleum directly, the gathering of seismic data has become a vital part of selecting the site of exploratory and development wells. Experience has shown that the use of seismic data greatly improves the likelihood of a successful venture.

Seismic data acquisition is routinely performed both on land and at sea. At sea, seismic ships may trail a streamer or cable behind the ship as the ship moves forward. Alternatively, the ships may deploy receivers and allow the receivers to rest on the ocean floor. This is known as an on-bottom cable (OBC) operation. In OBC operations a second ship typically deploys a seismic source with which to generate seismic waves. Processing equipment aboard the two ships controls the operation of the seismic source and receivers and processes the acquired data.

The cables normally include electrical or fiber-optic cabling for connecting the receivers to seismic monitoring equipment on a ship. The receivers may be uniformly spaced along the cables, and the cables may typically be several miles in length. Data is digitized near the receivers and transmitted to the ship through the cabling.

Various types of seismic sources are used to generate seismic waves for the seismic measurements. To determine the location and configuration of subsurface structures, the seismic source emits seismic waves that travel through the water and earth. These seismic waves generate reflections at various interfaces, including the interfaces created by the presence of the subsurface structures. By determining the length of time that the seismic waves take to travel from the seismic source to the subsurface structure and back to the seismic receivers, an estimate of the distance to subsurface structure can be obtained. By estimating the distance from the various receivers to a subsurface structure, the geometry or topography of the structure can be determined. Certain topographical features are indicative of oil and/or gas reservoirs.

Two primary types of receivers are used in seismology: hydrophones and geophones. Most commonly used for marine seismology are the hydrophones, sometimes called marine pressure phones. These receivers detect pressure changes, and are usually constructed using a piezoelectric transducer that generates a voltage proportional to the pressure change it experiences. Geophones are particle motion detectors commonly used for land seismology and may be particle displacement, particle velocity or particle acceleration detectors. Geophones are directional, i.e., they provide outputs that are dependent on the orientation of the sensor, whereas hydrophones are omnidirectional.

Recently, seismologists have begun using dual sensor receivers for OBC operations. Dual sensor receivers include both a hydrophone and a geophone. Signal traces from each sensor are processed and combined so as to produce an improved seismic trace. The directionality of a geophone allows a well-designed system to reduce or eliminate ghosts and other signal artifacts from the hydrophone signal. Ghosts are undesirable seismic signals which have at some stage traveled upwards towards the sea surface before traveling down to the receiver.

The simultaneous collection of pressure and velocity or other particle motion information has the general potential to allow separation of upgoing and downgoing energy, and thus perform ghost removal for marine data. In the special case of the receivers being positioned on the sea floor, it should also be possible to remove all energy that is trapped in the water layer (simple water bottom multiple energy). However, this requires scaling one of the signal traces by a factor that is dependent on the reflectivity at the water bottom. Inclusion of effects of the source ghost as well as receiver ghost have led to development of so called "Baccus filter methods" which attempt to remove the source ghost as well as the receiver ghost.

Existing processing methods for reducing ghosts and signal artifacts generally make some combination of the following assumptions: that the seismic waves are vertically incident plane waves, that the geophone response is onmidirectional, that the hydrophone and geophone have similar impulse responses, that the sensors are perfectly coupled, and that the sensors have similar noise characteristics. In fact, some field systems are now manufactured to "balance" the response of the two detector types in an attempt to make these assumptions valid and to avoid any requirement for additional scaling. However, since some of these conditions are deterministic and measurable, it would be desirable to provide for a processing method that does not limit its accuracy by making any of these assumptions. Additionally it would be preferable to combine the signals in a way which improves the signal-to-incoherent-noise ratio in the combined result.

It is noted that no currently available methods address the angular dependence of the reflectivity of the ocean floor. Any attempt to provide a simple scalar correction is at best only a first order approximation, since reflectivity may depend on the angle of incidence. It may be argued that the range of incident angles in seismic data is small enough for the approximation to be valid, but this is unlikely to be true for reflections in shallow water layers.

It is notable that most current methods are designed to combine the signals from a hydrophone and a geophone by simple scaling and summation. It is desirable to make the scalars be dependent on the signal (regardless of the method of determination). We describe here a method of combination which is dependent on Signal to Noise, and additionally may be different for each frequency recorded. The result has the benefit of having better signal to noise characteristics than any simple summation method.

SUMMARY OF THE INVENTION

Accordingly, there is disclosed herein a method for processing data from dual sensor receivers to produce a combined seismic trace. A first seismic trace is received from a geophone and second seismic trance from a hydrophone in a dual sensor receiver. This first and second seismic traces are transformed into a first and second seismic spectrum. The seismic spectrums are deghosted to obtain deghosted spectrums. The seismic spectra may be added to obtain a deghosted third spectrum. An inverse power is computed for each of the deghosted spectra. The inverse powers for each deghosted spectra are divided by sums of the deghosted spectra to obtain diversity filters. The first and third diversity filters are applied to the first seismic spectrum to obtain a scaled first seismic spectrum applying the second and third diversity filters are applied to the second seismic spectrum to obtain a scaled second seismic spectrum. The first scaled and second scaled seismic spectra are added to obtain a diversity scaled seismic spectrum. The diversity scaled seismic spectrum is inversely transformed to obtain the combined seismic trace.

BRIEF DESCRIPTION OF THE DRAWINGS

A better understanding of the present invention can be obtained when the following detailed description of the preferred embodiment is considered in conjunction with the following drawings, in which.

Figure 1:
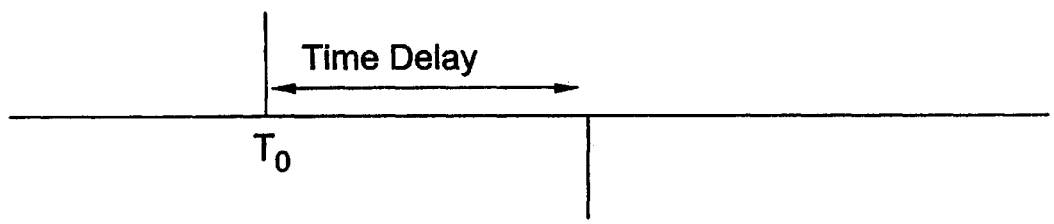
FIG. 1 is a theoretical hydrophone ghost response.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims, such as for example, where an accelerometer is used as a geophone.

DETAILED DESCRIPTION OF PREFERRED EMBODIMENTS

Figure 16:
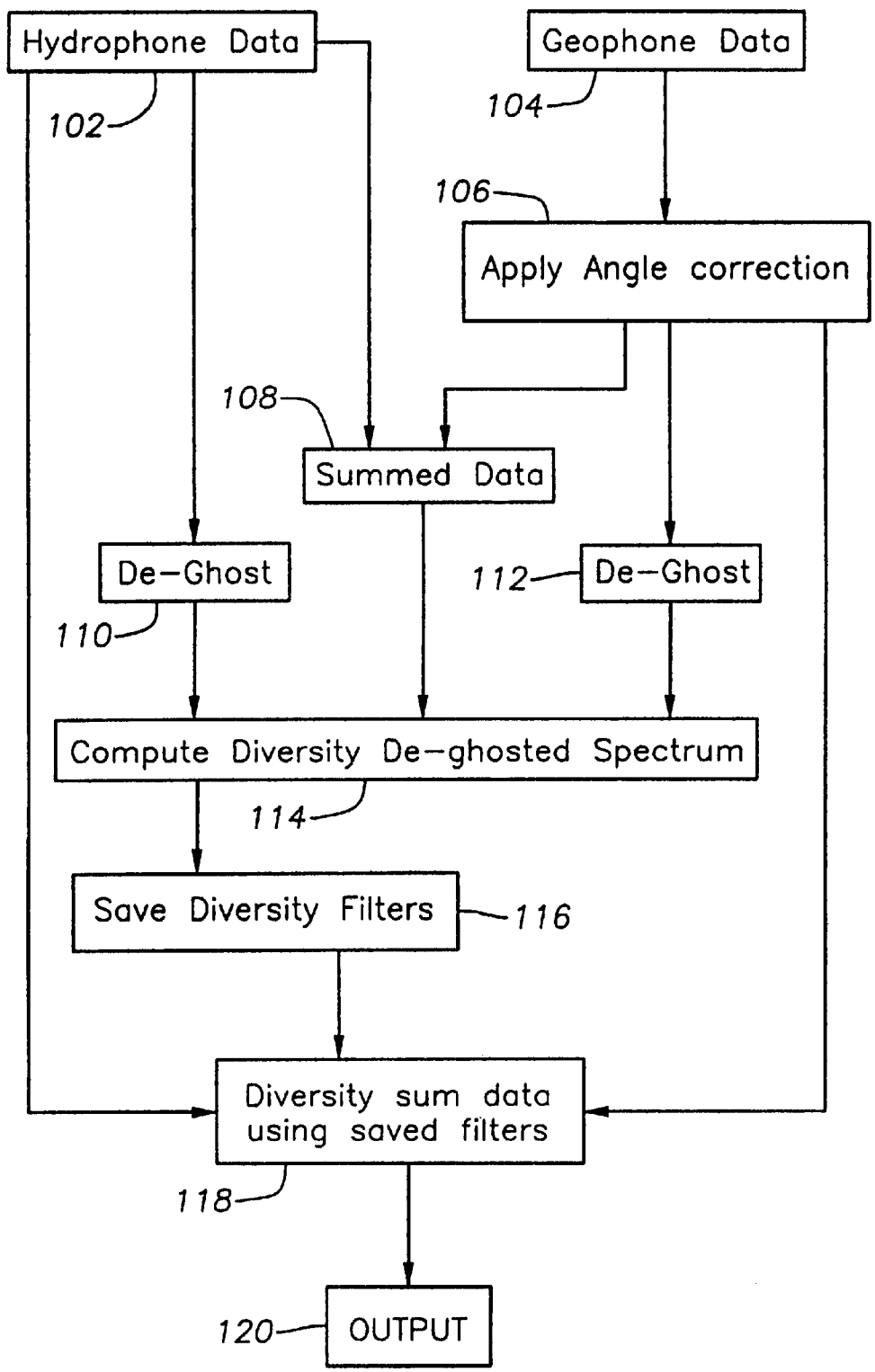
FIG. 16 shows a flowchart of the present method without a de-reverberation option.

Turning now to the figures, FIG. 16 shows a first method for processing dual sensor seismic data. Each receiver includes a hydrophone and a geophone that detect seismic waves. The seismic traces acquired by the hydrophone sensors and geophone sensors are available from blocks 102 and 104 respectively. In block 106, the geophone traces are multiplied by a position and time dependent function to correct for the incidence angle of arriving waves. The hydrophone and corrected geophone data is transformed to the;frequency domain, and in block 108, the transformed geophone data is combined with the transformed hydrophone data as a prelude to an estimation procedure for calculating dc-ghosting filters. In blocks 110 and 112, theoretical de-ghosting frequency spectra are applied to approximately correct the transformed hydrophone data and angle-corrected geophone data. The results of blocks 108, 110, and 112 should contain the same signal content (the deghosted signal), but will be different because of the different noise in hydrophone and geophone signals, and because of the method of derivation. These signals are processed in block 114 to determine an optimum de-ghosted spectrum using a diversity technique. In block 116 the optimum de-ghosted spectrum is used to determine minimum phase diversity filters for the hydrophone and geophone traces. In block 118, the diversity filters are applied to the hydrophone and geophone traces, and the filter outputs are summed to produce an output seismic trace which is available in block 120. Each of the blocks is discussed in greater detail below.

Figure 15:
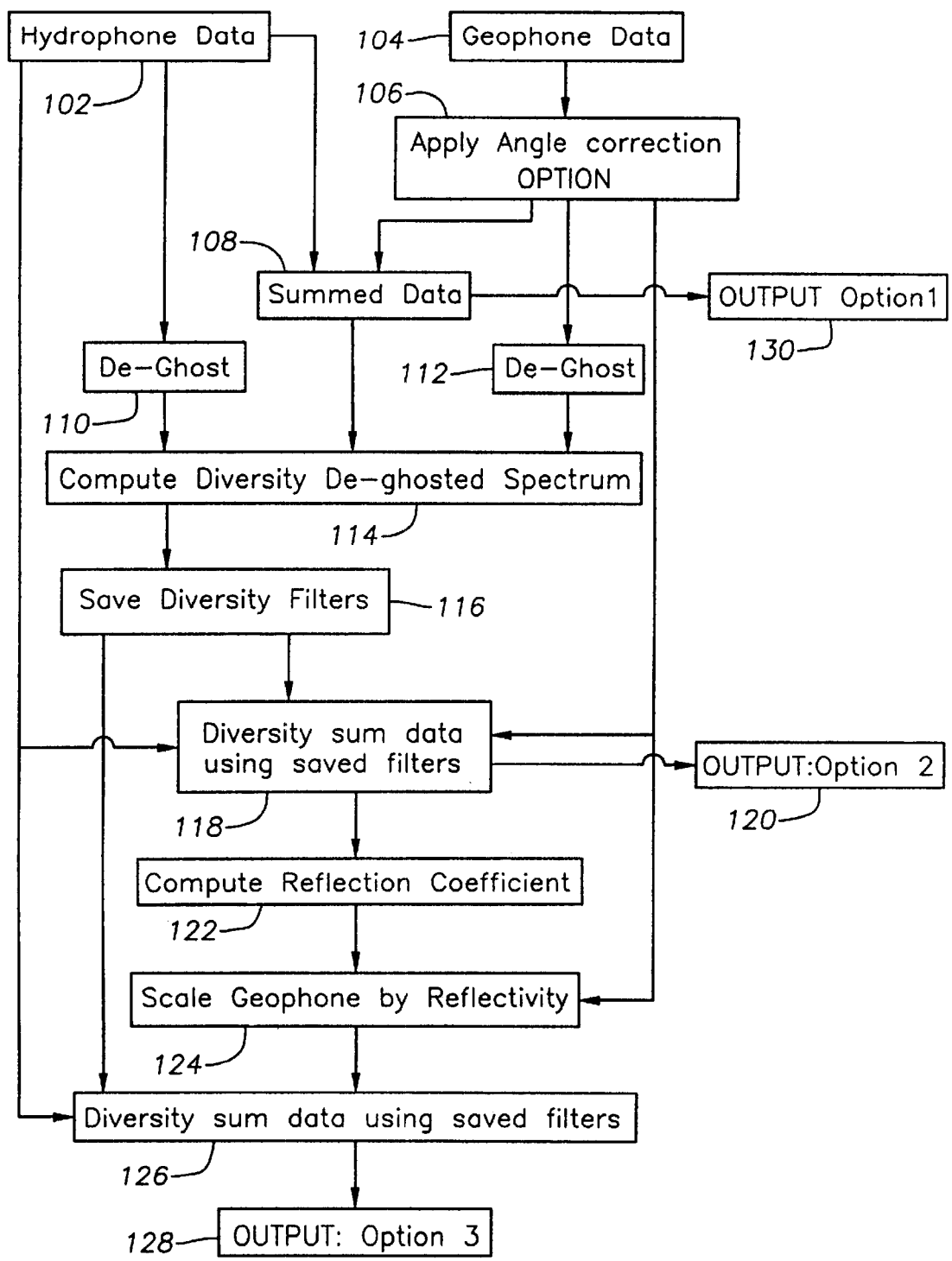
FIG. 15 shows a flowchart of the present method with a de-reverberation option.

FIG. 15 shows an improved method for processing dual sensor seismic data. This improved method includes additional steps to determine and correct for the effect of reflectivity coefficient as it relates to reverberation. In block 122, an autocorrelation of the diversity-summed seismic trace is calculated to estimate the a reflectivity coefficient. In block 124, this estimated coefficient is used to determine a second correction filter for the once-corrected geophone trace from block 106. The twice-corrected geophone trace is then provided to block 126 for diversity filtering and summing to produce an "R-corrected" output seismic trace, which is provided in block 128. FIG. 15 also shows optional outputs of intermediate traces in the process. In addition to the output trace in block 120 that corresponds to the output from the previous method, a summed trace with correction only for the angular dependence of the geophone is available in block 130. Each of the method blocks is now described in greater detail.

Method block 106 represents a scaling operation to correct the geophone traces for the incidence angle of seismic waves. The user inputs relevant to this block include: an enable switch to indicate whether or not this scaling operation is to be performed, a maximum gain, and a seismic wave velocity.

Method block 106 multiplies the geophone traces by a scale factor S1 that is dependent on offset (receiver location) and time:

$$SI = \min\left[\frac{1}{\sqrt{1-\left[\frac{x}{tv}\right]^2}}, G_{\max}\right]$$

where x is the offset (horizontal distance from source to receiver), t is time, and v is the specified velocity of the seismic waves. In one preferred embodiment, the velocity v is assumed to be constant. However, the velocity may also be specified as a function of time or depth.

Figure 5:
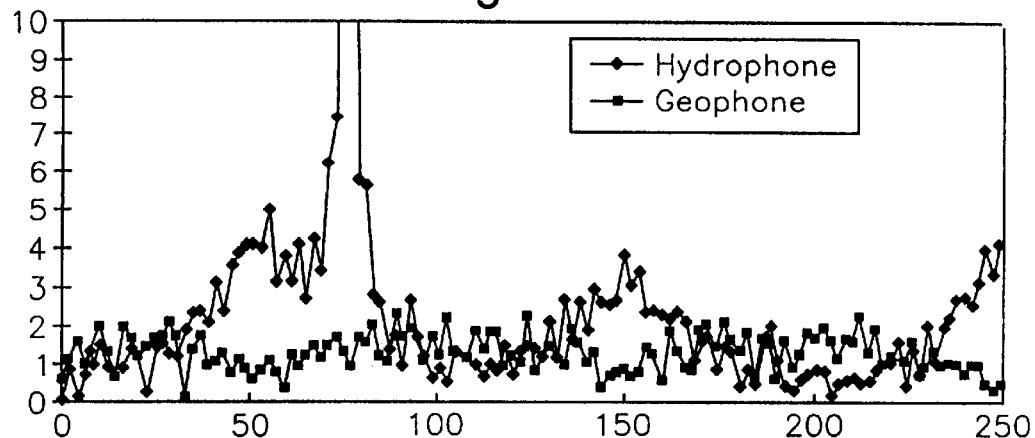
FIG. 5 is an exemplary spectrum of hydrophone and geophone data.
Figure 6:
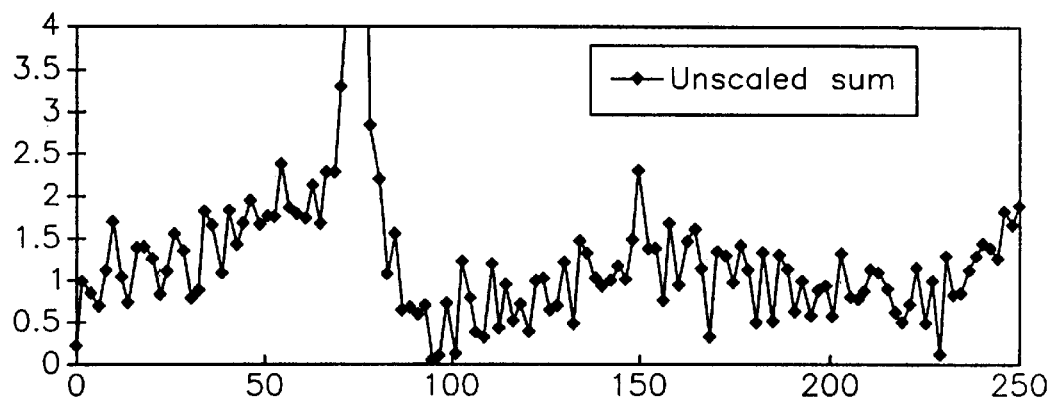
FIG. 6 is a simple sum of the hydrophone and geophone spectra.

FIG. 5 shows an example of a trace from a dual sensor receiver. The hydrophone and geophone traces are largely dominated by noise. The spectral content which results from a direct sum of the two traces is shown in FIG. 6.

The Hydrophone data and angle-corrected geophone data are frequency transformed prior to being summed in method block 108 and prior to being operated on in method blocks 110, 112. These three blocks serve to provide estimates of the de-ghosted seismic information. The user inputs relevant to this block include: water depth and estimate of the ghost magnitude (close to unity). The hydrophone data H(t) and corrected geophone data G(t) are Fourier transformed to the frequency domain. The resulting spectra H(F) and G(t), respectively, are complex-valued functions over a frequency range from 0 Hz to the Nyquist frequency.

Method blocks 108, 110, 112 each calculate an estimate for the amplitude spectra after de-ghosting:

EST1(*f*)=SQRT((realH(*f*)+realG(*f*))$^2$+(imagH (*f*)+ imagG (*f*))$^2$))    Estimate 1:

EST2(*f*)=SQRT(realH(*f*)$^2$+imagH(*f*)$^2$))/AMPGhostH(*f*)    Estimate 2:

EST3(*f*)=SQRT(realG(*f*)$^2$+imagG(*f*)$^2$))/AMPGhostG(*f*)    Estimate 3:

Estimate 1 is the estimated amplitude spectra that result from a simple summation of hydrophone and geophone traces. Estimate 2 is the amplitude spectra of hydrophone traces divided by the ghost response spectrum of a hydrophone. Estimate 3 is similarly the amplitude spectra of geophone traces divided by the ghost response spectrum of a geophone.

The amplitude spectrum for the hydrophone ghost response can be constructed theoretically from the assumption that it is the combination of two delta functions (spikes) of unity magnitude. The first spike is a positive spike at time t=0, and the second spike is a negative spike delayed by the two-way travel time in the water layer, as shown in FIG. 1. The second spike is an echo of the source reflecting off the water92s surface. The complex-valued frequency spectrum for this response is:

Hghost(Real)=1−cos(2.*pi.f.t*)

Hghost(Imaginary)=1−sin(2.*pi.f.t*)

where "t" is the two way travel time in the water layer:

t=2x water depth/water velocity

The amplitude spectrum of this response is:

AMPGhostH(*f*)=max(SQR T(Hghost(real)$^2$+Hghost(imaginary)$^2$), G$_{min}$)

Figure 2:
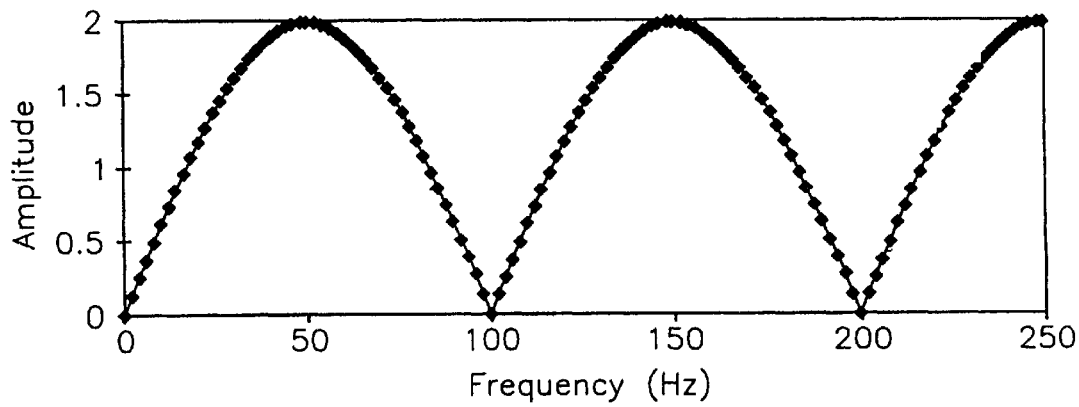
FIG. 2 is the corresponding hydrophone ghost spectrum.
Figure 3:
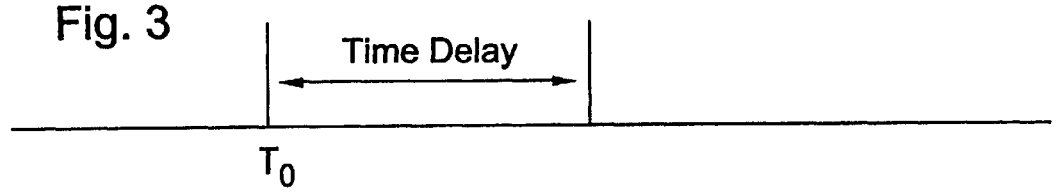
FIG. 3 is a theoretical geophone ghost response.

FIG. 2 shows the amplitude spectrum before the minimum limit constraint is imposed. Since this spectrum can go to zero, and a divide by AMPGhostH(f) is required, the minimum value of AMPGhostH(f) is constrained by the user provided minimum level ghost limit G$_{min}$, such that AMPGhostH(f) is always greater than G$_{min}$ The amplitude spectrum for the geophone ghost response can similarly be constructed theoretically from the assumption that it is the combination of two delta functions of unity magnitude. The first spike is a positive spike at time t=0, and the second spike is a positive spike delayed by the time for a two way trip in the water layer, (the same time as utilized in the hydrophone ghost) as shown in FIG. 3. The complex-valued frequency spectrum for this response is:

GhostG(Real)=1+cos(2.*pi.f.t*)

GhostG(Imaginary)=1+sin(2.*pi.f.t*)

where "t" is the two way travel time in the water layer as defined previously. The amplitude spectrum is similarly constructed:

AMPGhostG (*f*)=max(SQRT(GhostG(real)$^2$+GhostG(imaginary)$^2$), G$_{min}$)

Figure 4:
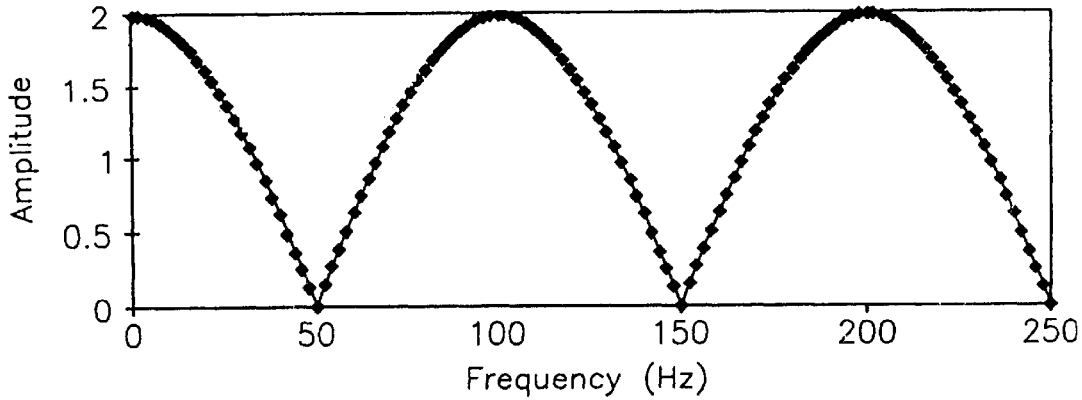
FIG. 4 is the corresponding geophone ghost spectrum.

FIG. 4 shows the amplitude spectrum for the geophone ghost response before the minimum limit is imposed.

The three estimates of the de-ghosted amplitude spectra generated by blocks 108, 110, and 112 will be different due to the presence of noise on individual traces. It is noted that the second and third estimates generated by blocks 110 and 112 respectively, will be dominated by noise in the regions where they are divided by small numbers in the ghost spectra. These portions of the estimates may even be the largest amplitudes in the spectra.

These de-ghosted estimates contain both signal and noise. The signal component may be small in comparison with the noise levels. However, the signal component is consistent throughout all the estimates, whereas the noise is different on each estimate. This characteristic makes these estimates candidates for the use of "diversity methods" for determining an optimum summation for computing the "optimum" amplitude spectrum (the spectrum having the largest signal-to-noise ratio).

To avoid excessive sensitivity to small amplitude values, a small amount of white noise may be added to each of the spectral estimates prior to their usage. The noise levels may be computed according to the user specified noise percentage:

Hydrophone noise: Hnoise=Average(AMP2(*f*))·Noise%

Geophone noise: Gnoise=Average(AMP3(*f*))·Noise%

So that the final adjusted estimates of the de-ghosted spectrum are given as

Figure 7:
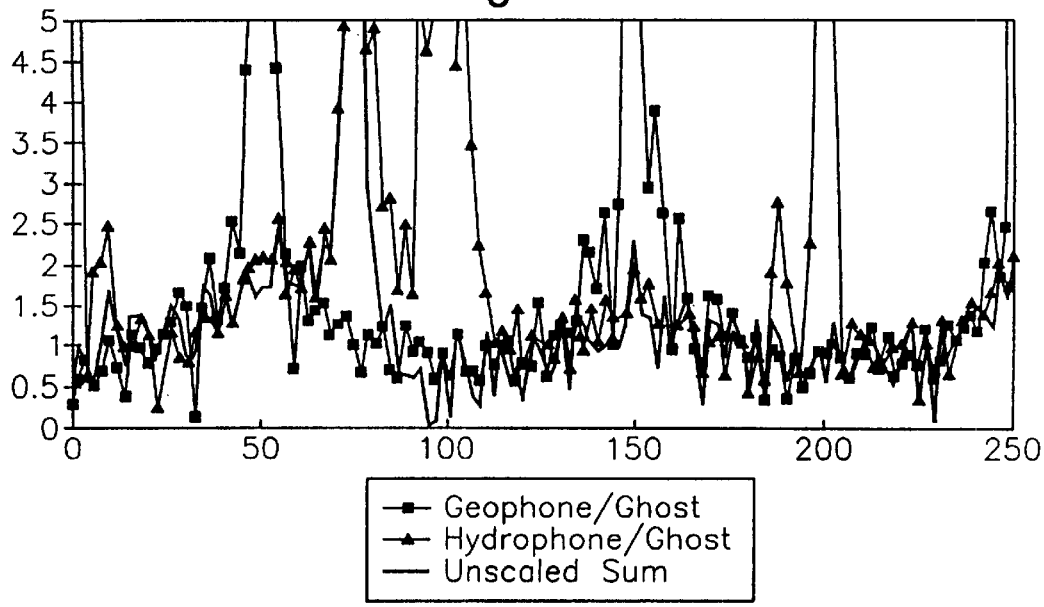
FIG. 7 shows three estimates of a de-ghosted spectrum.

EST2(*f*)=Hnoise+SQRT(realH(*f*)$^2$+imagH(*f*)$^2$))/ AMPGhostH(*f*)    Estimate 2:

EST3(/)=Gnoise+SQRT(realG(*f*)$^2$+imagG(*f*)$^2$))/ AMPGhostG(*f*)    Estimate 3:

The de-ghosted spectrum estimates are shown in FIG. 7. These estimates are derived from the traces shown in FIGS. 5 and 6. Note that the high amplitude "noise" in each representation is different.

Method block 114 determines the appropriate scaling factors for combining the spectrum estimates to obtain an "optimum" de-ghosted spectrum. As part of the process, the method block 114 estimates the noise ration between the geophone and the hydrophone. The user input relevant to this block is a power diversity exponent exp (defaults to 2).

For each estimated de-ghosted amplitude spectrum, method block 114 computes the inverse power:

INV1($f$)=1/(EST1($f$)$^{exp}$)

INV2($f$)=1/(EST2($f$)$^{exp}$)

INV3($f$)=1/(EST3($f$)$^{exp}$)

and sums the inverse powers:

SUM($f$)=INV1($f$)+INV2($f$)+INV3($f$)

The method block 114 then determines the diversity scaling factors:

SCALE1($f$)=INV1($f$)/SUM($f$)

SCALE2($f$)=INV2($f$)/SUM($f$)

SCALE3($f$)=INV3($f$)/SUM($f$)

If an intermediate output is desired from block 114, then block 114 may apply these scale Factors to the complex valued frequency spectrum of the hydrophone data and corrected geophone data:

DeghostR($f$)=RealEST1($f$)*SCALE1($f$)+realH($f$)*SCALE2($f$)+realG($f$)*SCALE3($f$)

DeghostI($f$)=IMAGEST1($f$)*SCAL1E($f$)+ImagH($f$)*SCALE2($f$)+ImagG($f$)*SCALE3($f$)

This can be re-stated in the following form:

DeghostR($f$)=realH($f$)*(SCALE2($f$)+SCALE1($f$))+realG($f$)*(SCALE3($f$)+SCALE1($f$))

DeghostI($f$)=ImagH($f$)*(SCALE2($f$)+SCALE1($f$))+ImagG($f$)*(SCALE3($f$)+SCALE1($f$))

Figure 8:
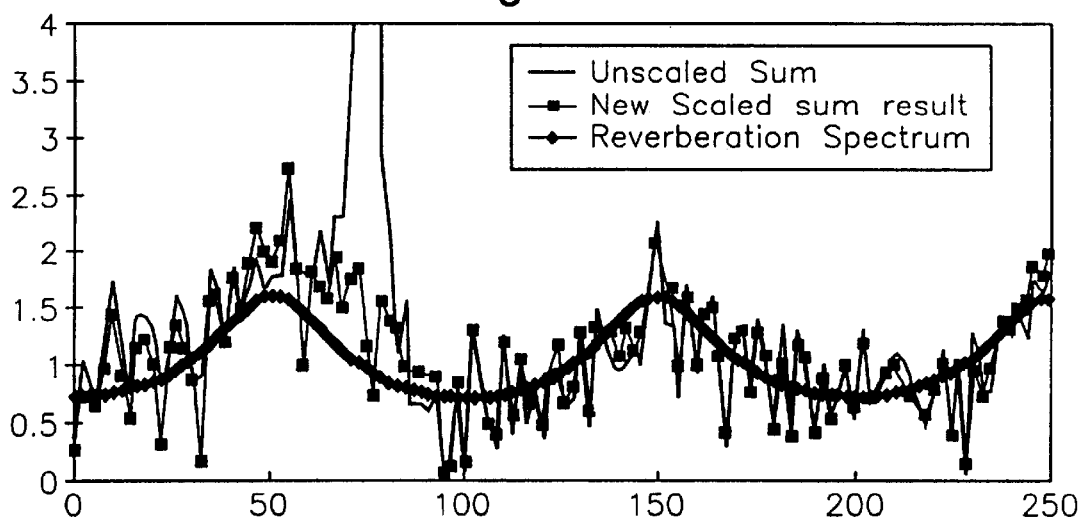
FIG. 8 shows a comparison of combined spectral estimates.

FIG. 8 compares the simple average of the hydrophone and geophone traces with the diversity-scaled summation. Also shown is the reverberation spectrum which will be addressed later. Both traces (hydrophone and geophone) contained random noise, but in addition, there is mono-frequency noise on one component that is not on the other. This is well attenuated by the diversity procedure.

Method block 116 takes the above-calculated diversity scale factors in the frequency domain, and calculates the complex-valued amplitude spectrum of minimum phase filters which have the same energy spectrum as the scalar values. A pair of filters is calculated, one for the hydrophone data and one for the geophone data. Given a desired amplitude spectrum, various existing techniques may be used to calculate the minimum phase filter that possesses the desired amplitude spectrum.

Method block 118 takes the minimum phase diversity filters, applies them to the frequency-transformed hydrophone traces and angle-corrected geophone traces, and sums the filtered results. An inverse Fourier transform of this sum provides the output result available in block 120. However, as indicated in FIG. 8, a reverberation artifact is still present. A "de-reverberation" option is preferably provided as indicated in FIG. 15.

Figure 9:
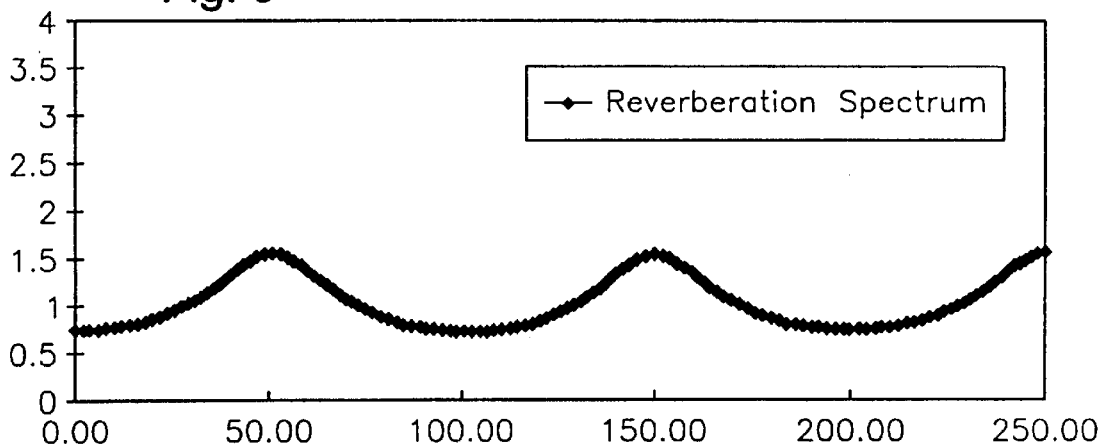
FIG. 9 shows an exemplary reverberation spectrum for a reflectivity of 0.4.
Figure 10:
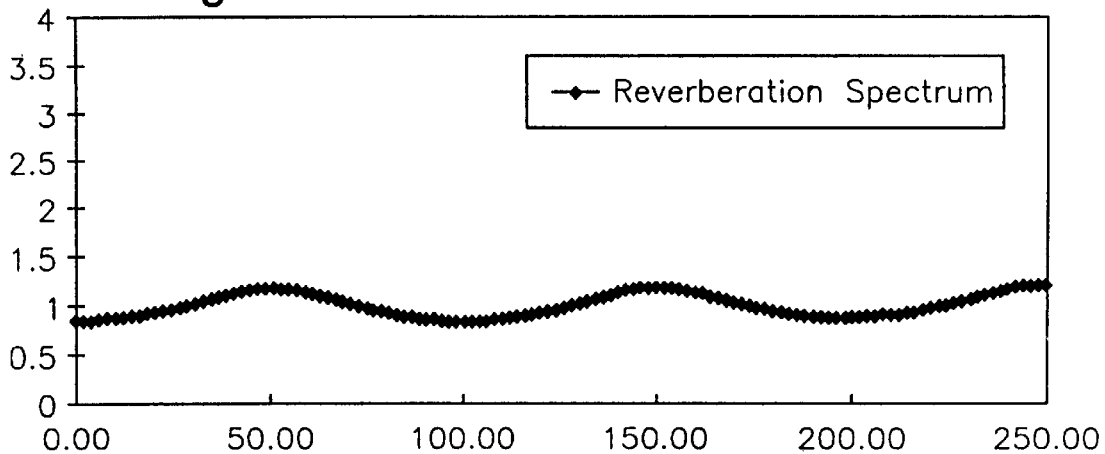
FIG. 10 shows an exemplary reverberation spectrum for a reflectivity of 0.2

The de-ghosted amplitude spectrum is perturbed by the reverberation sequence due to sound trapped in the water payer. This reverberation sequence is given by:

$1, -Re^{iwt}, +R^2 e^{iw2t}, -R^3 e^{iw3t}$, etc.

Where each subsequent bounce is delayed by the two way time in the water layer. The net effect of this is to introduce a "ripple" into the amplitude spectrum. FIG. 9 and show that this ripple is not a big feature even for large values of "R" the reflectivity of the water bottom. FIG. 9 shows a reverberation spectrum for a reflectivity of 0.4, and FIG. 10 shows a reverberation spectrum for a reflectivity of 0.2.

As developed below, a comparison of the autocorrelation values at zero lag and at the reverberation lag provides for an efficient estimate of the reflectivity R. This computation may be performed using only the amplitude spectrum values of the de-ghosted trace, and omitting the phase values.

The zero lag value of the autocorrelation is given as $$A(0) = \sum_{j=0}^{n} R^{2j}$$

so that:

$A(0) \cdot (1-R^2) = 1 - R^{n+2}$

If R<1 then $$A(0) = \frac{1}{1-R^2}$$

The required time lag value of the autocorrelation is given as:

$$A(t) = \sum_{j=0}^{n} -R^{2j+1}$$

$A(t) \cdot (1-R^2) = -R - R^{n+2}$

If R<1 then $$A(t) = \frac{-R}{1-R^2}$$

So the value of reflectivity can be computed as the ratio of the time lag value to the zero lag value of the autocorrelation:

$$\frac{A(t)}{A(0)} = -R$$

If the values of the amplitude spectrum of the optimum de-ghosted data are given as DEG($f$)

Then the power spectrum is computed as:

PWR($f$)=DEG($f$)$^2$ and the zero lacy value of the auto correlation is computed as:

$$LAG(0) = PWR(0) + PWR(Nyquist) = 2 \sum_{j=i}^{j} PWR(f).$$

Where the indices "i" and "j" include all values off except Zero and Nyquist. The time lag value of the auto correlation is computed as:

$$LAG(t) = PWR(0) + PWR(Nyquist) + 2\sum_{f=i}^{j} PWR(f) \cdot \cos(2\pi f t)$$

Where "t" is the two way time in the water layer.

Method block 122 takes the diversity-summed data from block 118 and the previously calculated two-way travel time for sound in the water layer, and calculates an auto-correlation of the diversity-summed data at zero and at the water depth reverberation period. This autocorrelation value yields an estimate of the reflectivity R of the water bottom:

$$R = \frac{LAG(t)}{LAG(0)}$$

Method block 124 takes this reflectivity estimate and scales the angle-corrected geophone data by the following scalar:

SCALAR=(1+R)/(1−R)

Method block 126 takes the "R-scaled" geophone data and, using the previously determined diversity filters for diversity scaling, adds it to the hydrophone data in the frequency domain. First, three traces are calculated:

T1=H(f)+G(f). SCALAR

T2=H(f)

T3=G(f).SCALAR

These traces are then summed (in the frequency domain) on the basis of the diversity filters previously computed, and the final result inverse transformed to yield the optimum de-reverberated trace.

Finalreal(f)=T1real(f)*SCALE1(f)+T2real(f)*SCALE2(f)+ T3real(f)*SCALE3(f)

Finalimag(f)=T1imag(f)*SCALE1(f)+T2imag(f)*SCALE2(f)+ T3imag(f)*SCALE3(f)

Figure 11:
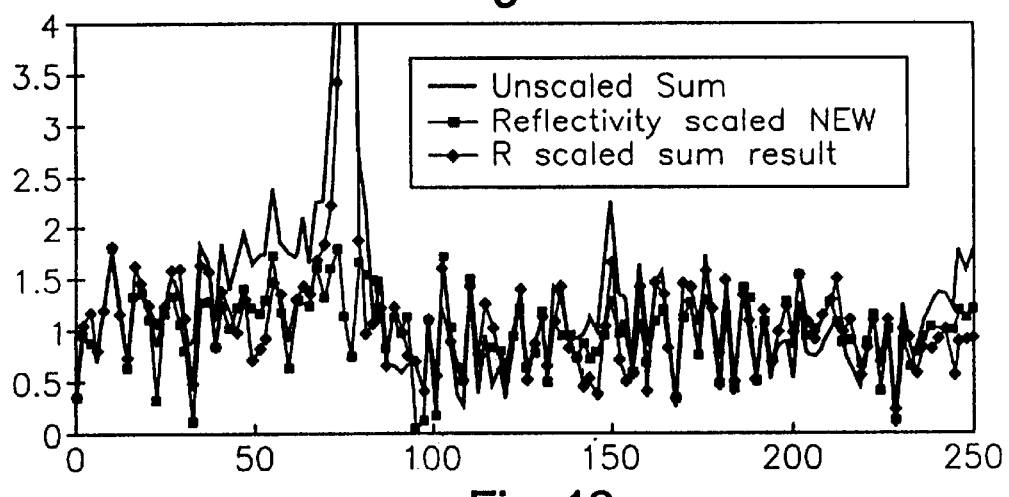
FIG. 11 shows a comparison of de-reverberated combined spectral estimates.

FIG. 11 shows a comparison of the spectra of (1) a simple sum of the traces, (2) a simple sum of the hydrophone data with the "R-scaled" geophone data, and (3) a diversity sum of the hydrophone data with the R-scaled geophone data. It is noted that the "peak" which represents a concentrated noise presence at a particular frequency is largely eliminated due to the robustness of the new method.

Figure 12:
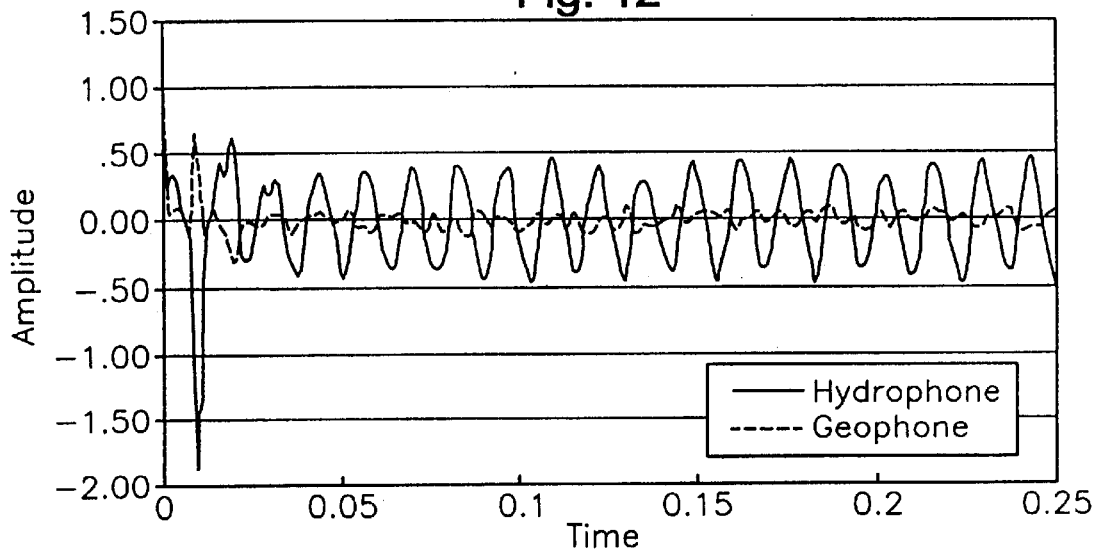
FIG. 12 shows exemplary time-domain traces of hydrophone and geophone data.
Figure 13:
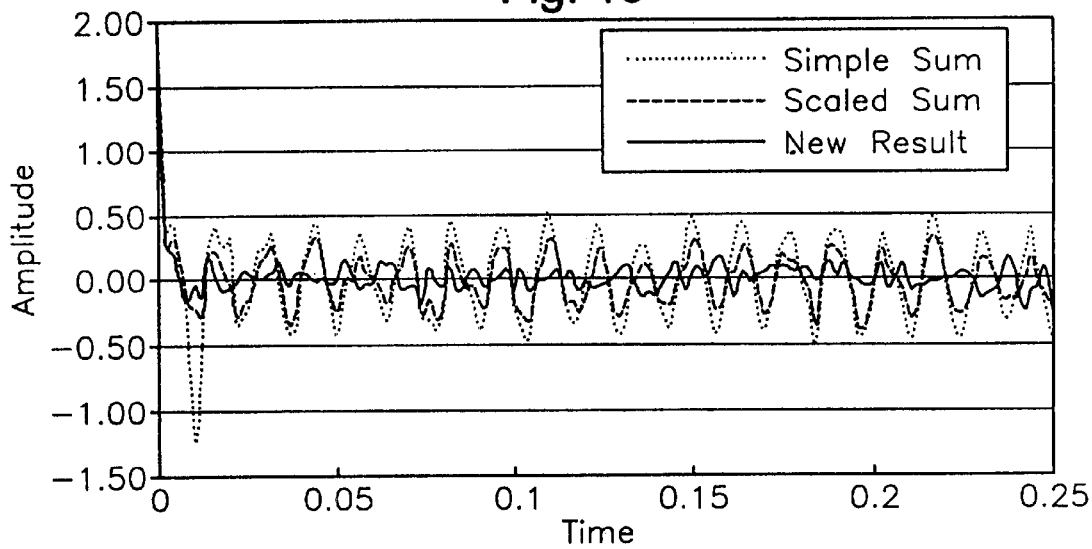
FIG. 13 shows a comparison of combined hydrophone and geophone data.
Figure 14:
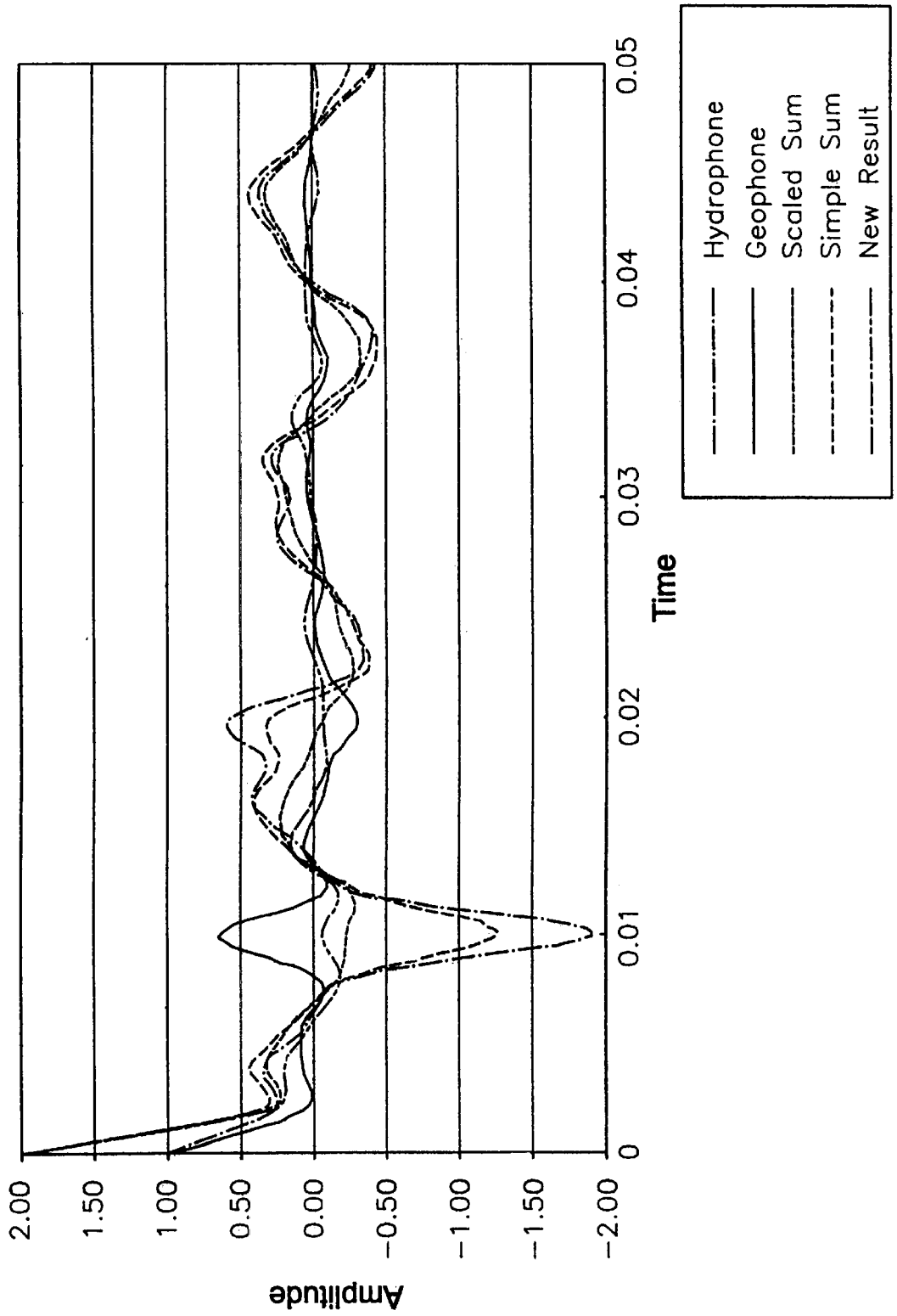
FIG. 14 shows an expanded time view of the combined hydrophone and geophone data.

FIG. 12 shows a time-domain example of hydrophone and geophone traces from a dual sensor receiver. FIG. 13 shows the time-domain comparison of the various combination methods including (1) a simple sum (largest amplitude), (2) a simple sum of the hydrophone and the R-scaled geophone, and (3) a diversity scaled sum of the hydrophone and R-scaled geophone trace (smallest amplitude). FIG. 14 shows an expanded time view of FIG. 13 along with the unscaled hydrophone and geophone traces.

Numerous variations and modifications will become apparent to those skilled in the art once the above disclosure is fully appreciated.

What is claimed is:

1. A method for processing data from dual sensor receivers to produce a combined seismic trace, the method comprising:

(a) receiving a first seismic trace from a geophone in a dual sensor receiver;

(b) transforming the first seismic trace into a first seismic spectrum;

(c) deghosting the first seismic spectrum to obtain a deghosted first spectrum;

(d) receiving a second seismic trace from a hydrophone in the dual sensor receiver;

(e) transforming the second seismic trace into a second seismic spectrum;

(f) deghosting the second seismic spectrum to obtain a deghosted second spectrum;

(g) adding the first and second seismic spectra to obtain a deghosted third spectrum;

(h) computing an inverse power for each of the first, second and third deghosted spectra;

(i) dividing the inverse powers for each to the first, second and third deghosted spectra by a sum of the first, second and third deghosted spectra to obtain first, second, and third diversity filters;

(j) applying the first and third diversity filters to the first seismic spectrum to obtain a scaled first seismic spectrum;

(k) applying the second and third diversity filters to the second seismic spectrum to obtain a scaled second seismic spectrum;

(l) adding the first scaled and second scaled seismic spectra to obtain a diversity scaled seismic spectrum; and (m) inverse transforming the diversity scaled seismic spectrum to obtain the combined seismic trace.

2. The method of claim 1 further comprising applying to said first seismic trace a time-dependent scaling factor corresponding to $$S1 = \min\left(\left(\sqrt{\left|1 - \left(\frac{x}{tv}\right)^2\right|}\right)^{-1}, G_{max}\right)$$

where x is a horizontal distance from a source to the receiver, t is time, v is a specified velocity of the seismic waves, and $G_{max}$ is a predetermined limit.

3. The method of claim 1 further comprising:

(a) calculating a reverberation time period;

(b) calculating a first autocorrelation value for the diversity scaled seismic spectrum at time lag equal to the reverberation time period;

(c) calculating a second autocorrelation value for the diversity scaled seismic spectrum at a time lag equal to zero; and (d) using a ratio of the first and second autocorrelation values to determine a reflectivity coefficient.

4. A method for processing data from a dual sensor receiver to produce a combined seismic trace, wherein the method comprises:

(a) receiving a first seismic trace from a geophone in the dual sensor receiver;

(b) multiplying the first seismic trace by a time-dependent scaling factor to obtain an angle-corrected trace, wherein the time-dependent scaling factor corrects for an incidence angle of seismic waves;

(c) receiving a second seismic trace from a hydrophone in the dual sensor receiver; and (d) combining the angle-corrected trace and the second seismic trace to obtain the combined seismic trace.

5. The method of claim 4 wherein the time-dependent scaling factor corresponds to $$SI = \min\left(\left(\sqrt{\left|1-\left(\frac{x}{t\cdot v(t)}\right)^2\right|}\right)^{-1}, G_{max}\right)$$

where x is a horizontal distance from a source to the receiver, t is time, v(t) is a specified time-dependent velocity of the seismic waves, and $G_{max}$ is a predetermined limit.

6. The method of claim 4 wherein said combining includes deghosting at least one of the list consisting of: i) the first seismic traces, ii) the second seismic trace, iii) the angle corrected trace, and iv) the combined seismic trace.

7. The method of claim 6 wherein said deghosting the seismic traces includes determining diversity filters from the deghosted spectra.

8. The method of claim 6 wherein deghosting the first seismic trace includes:

(a) transforming the first seismic trace into a first seismic spectrum; and (b) dividing the first seismic spectrum by a first model ghost spectrum to obtain a deghosted first spectrum.

9. The method of claim 6 wherein deghosting the second seismic trace includes:

(a) transforming the second seismic trace into a second seismic spectrum; and (b) dividing the second seismic spectrum by a second model ghost spectrum to obtain a deghosted second spectrum.

10. The method of claim 8 wherein the first model ghost spectrum corresponds to:

AMPGhostG($f$)=max(SQRT(GhostG(real)$^2$+GhostG(imaginary)$^2$), $G_{min}$)

where $G_{min}$ is a predetermined limit, t is a delay time between a source impulse and a ghost impulse, and GhostG(Real) = 1 + cos(2.pi.f.t)

GhostG(Imaginary) = 1 + sin(2.pi.f.t).

11. The method of claim 9 wherein the second model ghost spectrum corresponds to:

AMPGhostH($f$)=max(SQRT(HghostH(real)$^2$+Hghost(imaginary)$^2$), $G_{min}$)

where $G_{min}$ is a predetermined limit, t is a delay time between an source impulse and a ghost impulse, and Hghost(Real) = 1 − cos(2.pi.f.t).

Hghost(Imaginary) = 1 − sin(2.pi.f.t).

12. The method of claim 6 wherein said combining further includes (a) Adding spectra from the first and second seismic traces to obtain a deghosted third spectrum;

(b) determining diversity filters from the first, second and third deghosted spectra;

(c) applying the diversity filters to the first and second seismic spectra to obtain a first scaled and second scaled spectra; and (d) adding the first scaled and second scaled seismic spectra to obtain a diversity combined seismic spectrum.

13. The method of claim 12 wherein said determining diversity filters includes:

(a) computing an inverse power spectrum for each of the first, second and third deghosted spectra; and (b) dividing the inverse powers for each of the first, second and third deghosted spectra by a sum of the first, second and third deghosted spectra to obtain first, second and third diversity filters.

14. The method of claim 13 wherein said inverse power spectra correspond to INV(f)=1/(EST(f)$^{exp}$), where exp is a power diversity exponent, and EST(f) corresponds to the respective deghosted spectrum.

15. The method of claim 14 wherein the power diversity exponent is 2.

16. The method of claim 13 wherein applying the diversity filters includes:

(a) applying the first and third diversity filters to the first seismic spectrum to obtain the first scaled seismic spectrum; and (b) applying the second and third diversity filters to the second seismic spectrum to obtain the second scaled seismic spectrum.

17. The method of claim 4 further comprising:

(a) determining a reverberation time period;

(b) calculating a first autocorrelation value of the combined seismic trace at a time lag equal to the reverberation time period;

(c) calculating a second autocorrelation value of the combined seismic trace at a time lag equal to zero; and (d) using a ratio of the first and second autocorrelation values to determine a reflectivity coefficient.

* * * * *

UNITED STATES PATENT AND TRADEMARK OFFICE
CERTIFICATE OF CORRECTION

PATENT NO. : 6,539,308 B2
APPLICATION NO. : 09/999115
DATED : March 25, 2003
INVENTOR(S) : David J. Monk and James A. Musser et al.

It is certified that error appears in the above-identified patent and that said Letters Patent is hereby corrected as shown below:

On the Title Page
In the Abstract Item (57) at line 3, please delete "seismic trance" and insert therefor -- seismic trace --.

At column 3, line 9, please delete "seismic trance" and insert therefor -- seismic trace --.

At column 3, line 19, please delete "spectrum applying" and insert therefor -- spectrum, and --.

At column 5, line 25, please delete "H(F) and G(t)" and insert therefor -- H(f) and G(f) --.

At column 5, line 32, please delete "2))" and insert therefor -- 2) --.

At column 6, line 65, please delete "noise ration" and insert therefor -- noise ratio --.

At column 7, line 27, please delete "SCAL1E(f)" and insert therefor -- SCALE 1(f) --.

At column 7, line 63, please delete "payer" and insert therefor -- layer --.

At column 8, line 2, please delete "values of "R"" and insert therefor -- values of "R," --.

At column 8, line 58, please delete "lacy value" and insert therefor -- lag value --.

At column 8, line 65, please delete "values off" and insert therefor -- values of f --.

Signed and Sealed this
Sixth Day of December, 2011

David J. Kappos
*Director of the United States Patent and Trademark Office*